Dec. 25, 1928.  
T. S. CURTIS  
1,696,794  
APPARATUS FOR HEAT TREATMENT OF MATERIALS  
Filed Aug. 6, 1926  2 Sheets-Sheet 1

INVENTOR.  
Thomas S. Curtis,  
BY Arthur P. Knight  
and Alfred W. Knight  
ATTORNEYS

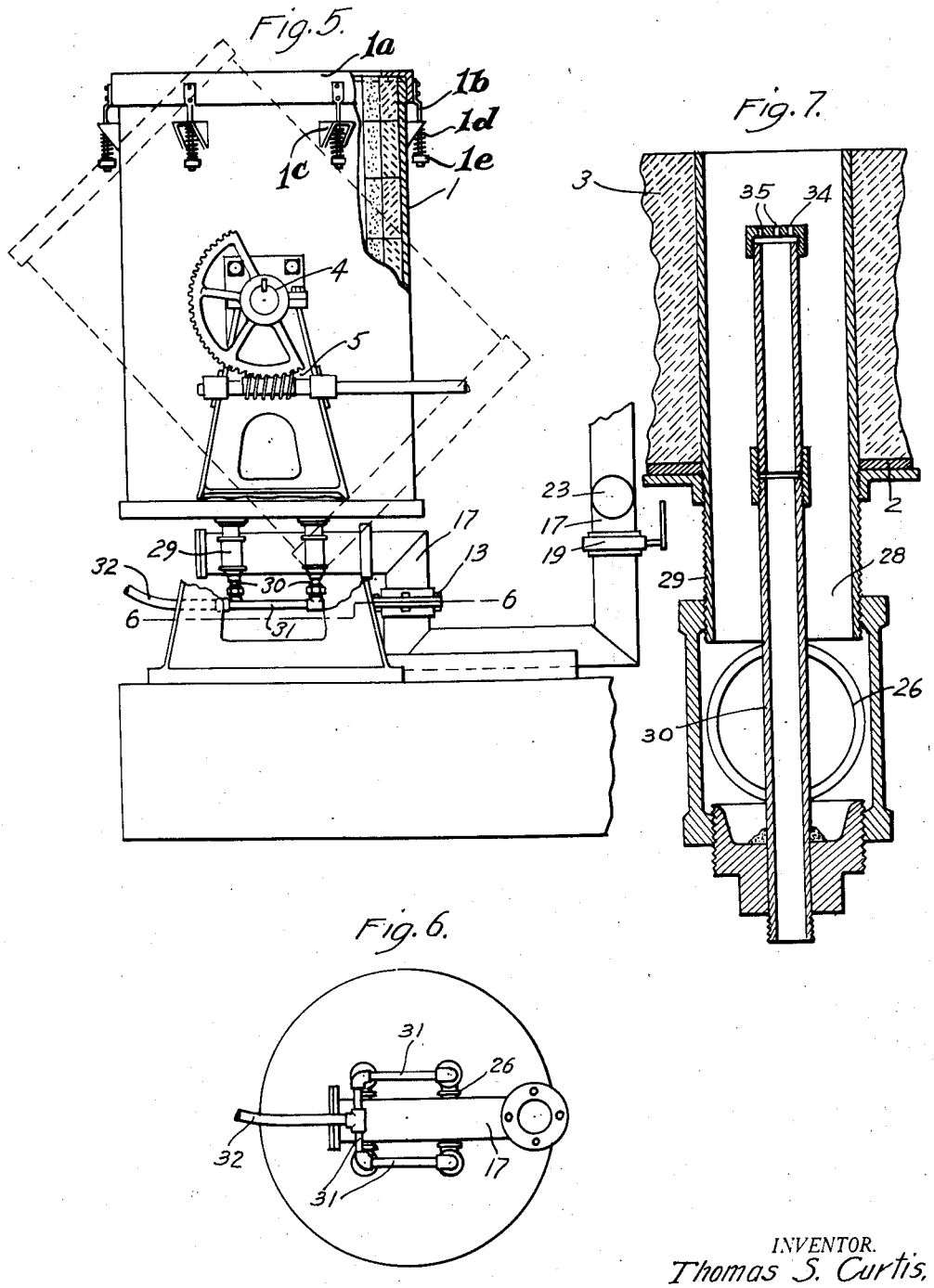

Patented Dec. 25, 1928.

1,696,794

UNITED STATES PATENT OFFICE.

THOMAS S. CURTIS, OF HUNTINGTON PARK, CALIFORNIA, ASSIGNOR, BY MESNE ASSIGNMENTS, TO THE VITREFRAX CORPORATION, OF LOS ANGELES, CALIFORNIA, A CORPORATION OF CALIFORNIA.

APPARATUS FOR HEAT TREATMENT OF MATERIALS.

Application filed August 6, 1926. Serial No. 127,601.

This application is a continuation in part of my United States patent application Serial No. 755,199, filed December 11, 1924. This invention relates to apparatus for use in the heat treatment of materials, for example in the heat treatment of compositions or mineral bodies for forming refractory materials. The main object of the invention is to provide an apparatus of this type in which an extremely high temperature may be produced by combustion of a mixture of combustible material and air in direct contact with the material to be treated. A further object of the invention is to provide an apparatus in which a substantially uniform condition of heat treatment may be secured throughout the charge. A further object is to provide an apparatus into which the material to be treated may be easily charged and from which such material may be easily discharged after treatment.

The apparatus, which may be termed a "converter", comprises essentially a casing formed of or lined with heat resistant material and having a heat treatment chamber, means for delivering a gaseous medium directly to said heat treatment chamber for combustion purposes, and means for tilting said casing in such manner as to permit the contents thereof to be discharged therefrom by gravity.

The combustible material may be either a gaseous, liquid, or solid fuel introduced into the heat treatment chamber together with a supply of air, so as to form the aforesaid gaseous medium for combustion purposes, or it may be a combustible material contained in or mixed with the material to be treated, in which case air alone, or an oxidizing mixture of air and combustible material, may be introduced into the heat treatment chamber so as to cause combustion of such contained combustible material.

The accompanying drawings illustrate embodiments of my invention and referring thereto:

Fig. 5 is a side elevation of a converter having a modified form of gas supply means.

Fig. 6 is an inverted horizontal section on line 6—6 in Fig. 5.

Fig. 7 is a detail vertical section of one of the inlet tuyères in the form of the invention shown in Figs. 5 and 6.

Figure 1:
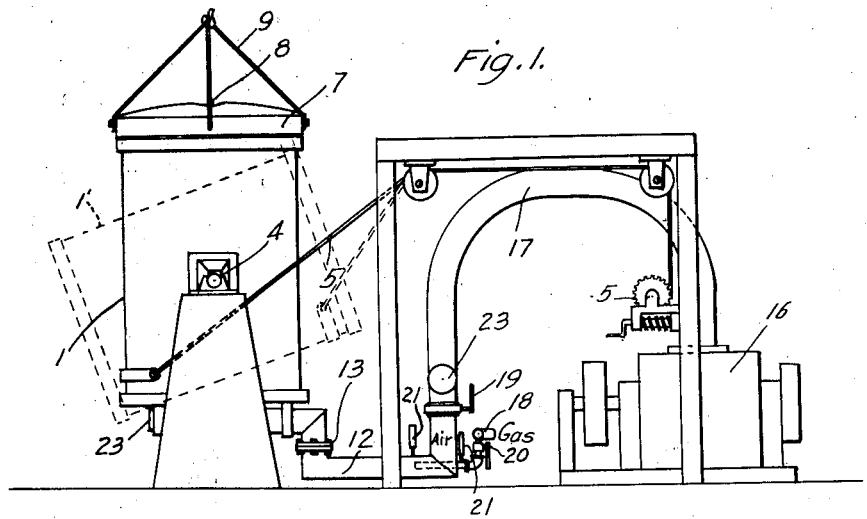
Fig. 1 is a side elevation of one form of heat treatment apparatus or converter, together with certain apparatus employed in conjunction therewith.
Figure 2:
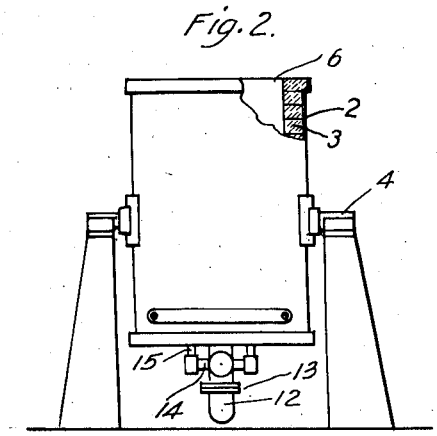
Fig. 2 is an end elevation of the converter.
Figure 3:
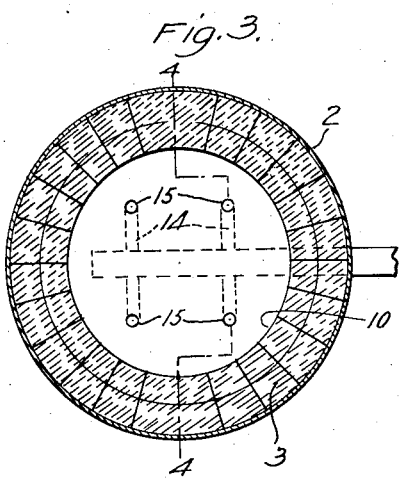
Fig. 3 is a horizontal section through the converter.
Figure 4:
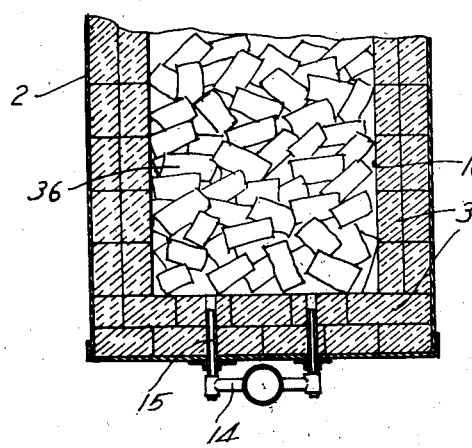
Fig. 4 is a vertical section through the lower portion of the converter on line 4—4 in Fig. 3.

The heat treatment apparatus itself, which may be called a converter, indicated at 1, comprises a cylindrical casing or shell 2 whose side and bottom walls are lined with suitable refractory or heat resistant material indicated at 3 so as to provide a heat treatment chamber 10. The converter is mounted to tilt in a vertical plane on horizontal axes or trunnions 4, suitable means indicated at 5 being provided for effecting such tilting operation. The converter is adapted, when in position for use, to stand in a vertical position and is open at its upper end as at 6 so as to permit charging and emptying. A removable cover 7 constructed or lined with refractory material may be provided for closing the upper end of the converter during certain stages of the operation thereof as hereinafter described, said cover having a suitable central vent or opening 8 to permit escape of combustion products therefrom. Suitable means 9 may be provided for lifting cover 7 off of the converter when desired.

In the form of the invention shown in Figs. 1 to 4 inclusive suitable supply means 12 are provided for mixing and supplying combustible material, such as fuel gas, and air to the converter, said supply means having a detachable connection 13 adapted to be disconnected so as to permit tilting of the converter. Said supply means 12 is connected by suitable branch pipes 14 to a plurality of tuyères 15 extending through the bottom of the converter at distributed points and adapted to supply or introduce gas and air into the heat treatment chamber 10 thereof.

Suitable means are provided for producing a supply of air under pressure, such means comprising for example an air compresser or blower 16 connected by pipe 17 to the air supply means 12. Gas supply means indicated at 18 are also provided for introducing the supply of fuel gas into the supply means 12. Supply means 12 therefore serves also as a mixing chamber for the gas and air. The air and gas supply means 17 and 18 are provided respectively with suitable valve means 19 and 20 and pressure gages or manometers 21 may be provided for indicating the pressure in the gas supply means and in the supply pipe or mixing chamber 12. Suitable means such as friction plugs or caps 23 may be provided at suitable points in the air supply pipe and in the fuel and air supply means 12 for preventing dangerous explosions, such plugs or caps being comparatively loosely held in place and adapted to be blown out in case of explosion thus preventing damage to any parts of the apparatus.

The apparatus shown in Figs. 5 to 7 inclusive is similar in most respects to that above described, the chief difference being that in this case the explosive or combustible mixture of fuel and air is formed substantially at the point at which it is introduced into the heat treatment chamber 10 of the converter. In this form of the invention the air supply pipe 17 is connected directly by branch pipes 26 to the air inlet passages 28 of the tuyères 29, there being as before a plurality of such tuyères entering through the bottom of the converter. The air inlet pipe 17 is provided with detachable connecting means 13 by means of which it may be readily disconnected to permit tilting of the converter.

Each of the tuyères is in this form of the invention provided with a gas inlet 30 which enters through the bottom of the tuyère and extends upward centrally within the same. All of said gas inlets are shown as connected by means of inlet pipes 31 to a flexible or hose connection 32 so as to permit tilting of the converter without breaking connection. If desired however a quick detachable connection may be substituted for the flexible connection. Each of the gas inlets 30 is provided at its upper end with a perforated cap 34 having perforations 35 through which the gas is delivered into the air substantially at the point at which such air enters the heat treatment chamber of the converter.

At the top the receptacle 1 is provided with a yieldable retainer ring 1ª which is flanged inwardly to engage over the lining of the receptacle. This ring is provided with depending fingers 1ᵇ which extend through apertured lugs 1ᶜ on the body of the receptacle and carry springs 1ᵈ which cooperate with the adjusting nuts 1ᵉ. It will be apparent that a yieldable retainer means is thus provided which not only acts to prevent the displacement or movement of the lining of the receptacle when it is tilted or dumped but also accommodates the expansion and contraction of the lining incident to the heating or cooling of the same in the use of the apparatus.

The operation of the device will be readily understood but in order to more clearly illustrate the same I will describe the operation in connection with the heat treatment of a mixture of iron and magnesium oxide in such manner as to produce a refractory material. In this operation the iron and magnesium oxide are intimately mixed in any desired proportions and are ground to the desired degree of fineness and are then preferably molded into the form of briquettes by mixing the dry ingredients with sufficient water to produce a stiff paste suitable for molding. These briquettes may then be dried and charged into the heat treatment chamber 10 of the converter as indicated at 36 in Fig. 4. For this purpose the briquettes may be raised on an elevator and dumped from a charging buggy into the throat of the converter (the cover 7 being of course removed for this purpose) without any regard for placement of the same, although it may be desirable to insert a rod in each of the four tuyères 15 or 29 while charging, so as to prevent the accidental covering of a tuyère by one of the briquettes in the first unit of the charge to be placed in the converter. As soon as the first buggy has been dumped the rods are withdrawn from the tuyères and charging proceeds until the converter is filled to the top.

The operation of the converter in the instance under consideration may be divided into two principal steps; the first, which may be called the gas or ignition step, consists in burning an explosive mixture of natural gas (or other fuel gas) and air in direct contact with the material in the converter. In starting the converter, gas is first admitted, through pipes 18 and 12 in the form first-above described, or directly through the gas inlets 30 in the second form, without the admission of any air, and such gas is ignited at the top of the converter which is still open. As soon as free combustion is established the air valve 19 is opened and an explosive mixture is obtained, which is immediately manifested by a mild explosion which extinguishes the free burning gas flame at the top of the converter and promotes the combustion, without visible flame, down inside the charge within the converter.

The proportions of air and gas necessary for this combustion are readily calculated if the composition and B. t. u. value of the gas are known. For example in the case of a typical Southern California natural gas having a value of approximately 1150 B. t. u. the proportions of gas to air are as 1 to 10.7. This mixture may be controlled for example by means of the low pressure, direct reading manometers 21 which read in ounces of pressure. The air is supplied by the positive pressure blower or other means 16 operating at from one and one half to two pounds per square inch gage pressure. Gas is delivered to the furnace at a pressure of approximately 6 pounds per square inch ahead of the control valve. The gas pressure beyond the control valve is maintained sufficiently above the pressure in the air supply line to positively prevent back flow of air into the gas line. The amount of this pressure difference is dependent of course upon the size of the air supply pipe and the size of the orifices through which the gas passes into the supply pipe 6 in the first form of the apparatus or into the tuyères 29 in the second form. The relation of these openings to the size of the air supply pipe is so designed that this excess of gas pressure over air pressure may always be maintained, thus preventing danger of explosions in the gas line. In the form of the invention shown in Figs. 1 to 4 the friction caps 23 serve to prevent serious danger in case of explosion within the supply means or mixing chamber 12, while in the form shown in Figs. 5 to 7 there is no possibility of such explosions since the gas and air are first mixed with one another substantially at the point of entrance to the heat treatment chamber in which the combustion takes place. In any event however the explosion hazard has virtually been eliminated by reducing the size of the tuyères sufficiently to provide for a gas velocity therethrough greater than the rate of flame propagation.

Once the combustion has been started, the operation of the converter is characterized by extreme simplicity, the fact that combustion is taking place being manifested solely by a roaring sound from within the converter. Usually for the first two to three hours of the operation no flame whatever is visible in the converter, and usually after three hours a color appears at the top of the converter and a trace of greenish, yellow flame shows above the charge. After about four hours and from that time until near the end of the first stage of the operaton, a slow but continuous settling of the charge is manifested. During the remainder of this gas period, as it is called, an additional charge of briquetted material can be added to that originally placed in the converter, due to the settling of the charge brought about by the partial fusion or softening thereof and the reaction occurring therein. During all the above stages of the operation of the converter, the removable cover 7 is left off, leaving the upper end of the converter open. Usually after twelve to fourteen hours of operation the portable cover 7 is placed on the converter to complete the burning of the charge at the extreme top of the vessel. The balance of the gas period, which in total comprises about nineteen hours, is then merely an operation of quiet combustion.

At the conclusion of the gas or ignition period the gas is turned off and air alone from the blower is admitted for about two hours or longer. This second stage, which I call the blasting or air period, has much to do with the quality of the finished product. During the period of air blast the operation is characterized first of all by a distinct rise in temperature and a very noticeable settling of the furnace charge. This, I believe to be due to the immense quantity of heat liberated by the oxidation of the iron, which up to this point has been maintained largely or partially in the metallic state, or possibly in the FeO state, due to the non-oxidizing condition in the converter. It is apparently chiefly during the blasting period that the final conversion into the desired compound takes place, as I have found this conversion to be far less complete when the air blast period is eliminated. The maximum temperature reached in the converter operation is cone 40 or about 3506° F. at which temperature the ingredients are partially fritted or sintered, or brought to a state of incipient fusion.

Immediately the air blast period has been completed, which is at the twenty-first hour of the furnace operation provided the above described schedule is followed, the converter may be tilted by means 5 preferably through an angle between 90° and 180°, for example to the position indicated in dotted lines at 1' in Fig. 1, so as to permit discharge of the treated material therefrom wholly or partly under the action of the force of gravity. While the charge is still white hot it may be removed from the tilted vessel, by barring down if necessary with tools familiar to every steel mill operator. The drawing operation usually requires from one to two hours while the recharging is accomplished in about one half hour. The converter thus makes one complete cycle in about twenty four hours.

The converter may be used in many other operations. For example, it may be advantageously employed for heating magnesia to convert it to the form of periclase or for heating alumina to produce corundum. In either of these two cases, the magnesia or alumina may be charged into the converter in the form of lumps or fragments of the crude ore, or it may be ground, subjected to any desired purifying or grading operations, and briquetted or otherwise formed into aggregates of the desired size. In the heat treatment of such materials in the above-described converter, a mixture of gas and air, having insufficient air for complete combustion, is preferably introduced through the tuyères and burned in the converter during the first stage, whereby the material is heated and at the same time, on account of the partial combustion of the gas, finely divided carbon is deposited within and throughout the more or less porous fragments of material. Then the gas is wholly or partly cut off, and a blast of air alone, or an oxidizing mixture of gas and air, is introduced through the tuyères, which causes oxidation of the carbon in the material and produces an extremely high temperature, whereby the desired change in structure and physical characteristics is brought about. This may be continued for any desired time, after which the blast may be discontinued and the converter may be opened and tilted for removal of the treated material.

In the case just described, the gas admitted with the air is utilized as the combustible material during the first stage of the operation, while the carbon deposited in the aggregates of material during the first stage is utilized as the combustible material during the second stage. During both stages, however, the combustion takes place in direct contact with the material to be treated, due to the fact that the combusible mixure is introduced directly into the treatment chamber in which such material is placed and is first permitted to burn after it enters such chamber.

In both of the examples above described, the heat treatment operation is carried out in two stages, and furthermore in each case, during the second or oxidizing stage, the heating is obtained by combustion of a combustible material contained in the body of material being treated. The use of the converter of my invention is not limited, however, to operations involving two stages, nor to operations in which part of the heating is accomplished by combustion of combustible material contained in the charge of material being treated. The converter may also be advantageously employed for heat treatment of various materials by simple combustion, in direct contact with the material being treated, of a combustible mixture supplied to the converter, such as a mixture of fuel gas and air.

I claim:

1. A converter of the class described comprising a receptacle, a refractory lining therefor and yieldable retainer means on said receptacle engaging with said lining and accommodating the expansion of the lining when heated, and means for treating the material in the receptacle.

2. A converter of the class described comprising a receptacle, means for dumping the receptacle, a refractory lining therefor, a retainer ring carried by said receptacle for preventing displacement of the lining when dumping, and means cooperating with said ring to permit relative movement between the ring and the receptacle due to the expansion and contraction of the lining.

3. An apparatus for heat treatment of material in fragmentary form without conversion to a molten condition comprising a receptacle having a chamber to receive fragmentary material to be heat treated, said receptacle being substantially vertical walled throughout its height and having an opening at its top extending entirely across said chamber, so as to facilitate charging of fragmentary material into said chamber and permit free discharge of such fragmentary material after heat treatment, upon tilting of the receptacle, means for supplying a combustible mixture of gas and air up through the bottom of said receptacle into said chamber, means for tilting the receptacle from vertical position to a position to cause discharge of fragmentary material from said chamber, and means for partially closing said opening at the top of the receptacle when the same is in vertical position while leaving an opening sufficient for exit of gaseous products of combustion therefrom.

4. An apparatus as set forth in claim 3, said means for supplying a combustible mixture of gas and air comprising an air conduit extending through the bottom of said receptacle and communicating with the bottom of said chamber and a gas conduit opening into said air conduit substantially at the point of communication of said air conduit with said chamber, whereby the gas and air are maintained separate substantially until their entrance into said chamber and are inter-mixed and burned within said chamber and in direct contact with the fragmentary material therein.

In testimony whereof I have hereunto subscribed my name this 19th day of July 1926.

THOMAS S. CURTIS.